(12) United States Patent
Motoyoshi (10) Patent No.: US 9,545,721 B2
(45) Date of Patent: Jan. 17, 2017

(54) ROBOTIC DEVICE, METHOD FOR CONTROLLING ROBOTIC DEVICE, AND COMPUTER PROGRAM

(71) Applicant: Seiko Epson Corporation, Tokyo (JP)

(72) Inventor: Masaki Motoyoshi, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/662,696

(22) Filed: Mar. 19, 2015

(65) Prior Publication Data

US 2015/0190928 A1    Jul. 9, 2015

Related U.S. Application Data

(63) Continuation of application No. 13/198,066, filed on Aug. 4, 2011, now Pat. No. 9,014,849.

(30) Foreign Application Priority Data

Aug. 6, 2010    (JP) .................. 2010-177066

(51) Int. Cl.
G05B 15/00    (2006.01)
G05B 19/00    (2006.01)
B25J 9/16    (2006.01)

(52) U.S. Cl.
CPC .................. B25J 9/1694 (2013.01)

(58) Field of Classification Search
USPC .............................. 700/245–264
See application file for complete search history.

(56) References Cited

U.S. PATENT DOCUMENTS

| | | | | |
|---|---|---|---|---|
| 5,627,440 | A * | 5/1997 | Yamamoto | G05B 19/416 318/568.21 |
| 6,507,165 | B2 * | 1/2003 | Kato | B25J 9/1641 318/568.22 |
| 6,508,122 | B1 | 1/2003 | McCall et al. | |
| 7,613,540 | B2 * | 11/2009 | Testa | G05B 19/404 318/570 |
| 7,765,023 | B2 | 7/2010 | Oaki et al. | |
| 8,482,242 | B2 | 7/2013 | Nakasugi | |
| 8,762,091 | B1 | 6/2014 | Foxlin et al. | |

(Continued)

FOREIGN PATENT DOCUMENTS

| CN | 1344908 A | 4/2002 |
|---|---|---|
| CN | 1502067 A | 6/2004 |

(Continued)

*Primary Examiner* — Bhavesh V Amin
(74) *Attorney, Agent, or Firm* — Harness, Dickey & Pierce P.L.C.

(57) ABSTRACT

A robotic device includes a first calculation section adapted to calculate a first angular velocity of a first arm operating due to a first actuator provided with a first angle sensor based on rotational angle detection data of the first angle sensor of the first actuator, a second calculation section adapted to calculate a second angular velocity of the first arm taking an arm linkage device as an axis based on angular velocity detection data of an inertial sensor provided to the first arm linked via the arm linkage device including the first actuator, which is a calculation object of the first calculation section, and a third calculation section adapted to calculate a torsional angular velocity between the first actuator and the first arm with a low-frequency component eliminated.

6 Claims, 6 Drawing Sheets

(56) References Cited

U.S. PATENT DOCUMENTS

| | | | |
|---|---|---|---|
| 8,803,465 B1* | 8/2014 | Smith | G05B 11/30 318/570 |
| 2001/0056324 A1* | 12/2001 | Miyazawa | B25J 9/1651 318/568.11 |
| 2003/0218440 A1* | 11/2003 | Eloundou | G05B 19/401 318/460 |
| 2004/0162509 A1 | 8/2004 | Sakurai et al. | |
| 2004/0179831 A1 | 9/2004 | Tsuruta | |
| 2005/0246061 A1* | 11/2005 | Oaki | B25J 9/1692 700/245 |
| 2007/0239315 A1 | 10/2007 | Sato et al. | |
| 2009/0058346 A1 | 3/2009 | Marushita et al. | |
| 2010/0104388 A1* | 4/2010 | Suzuki | B23Q 11/0039 409/131 |
| 2010/0148714 A1 | 6/2010 | Okita et al. | |
| 2010/0318223 A1* | 12/2010 | Motoyoshi | B25J 9/1638 700/253 |
| 2011/0004343 A1* | 1/2011 | Iida | B25J 9/1638 700/253 |
| 2012/0010748 A1* | 1/2012 | Sasai | B25J 9/1674 700/254 |
| 2012/0035763 A1 | 2/2012 | Motoyoshi | |
| 2012/0101624 A1* | 4/2012 | Ueno | B23Q 17/0976 700/173 |
| 2012/0169265 A1 | 7/2012 | Usui et al. | |
| 2012/0296471 A1 | 11/2012 | Inaba et al. | |
| 2013/0073086 A1* | 3/2013 | Motoyoshi | G05B 15/00 700/258 |
| 2013/0234642 A1 | 9/2013 | Igarashi et al. | |
| 2014/0039678 A1 | 2/2014 | Motoyoshi | |

FOREIGN PATENT DOCUMENTS

| | | |
|---|---|---|
| CN | 1984756 A | 6/2007 |
| JP | 63-201705 A | 8/1988 |
| JP | 01-173116 | 7/1989 |
| JP | 07-314360 | 12/1995 |
| JP | 10-006261 | 1/1998 |
| JP | 3442941 B2 | 9/2003 |
| JP | 2005-212054 A | 8/2005 |
| JP | 2005-242794 A | 9/2005 |
| JP | 2011-056622 A | 3/2011 |
| JP | 2011-136395 A | 7/2011 |

* cited by examiner

ROBOTIC DEVICE, METHOD FOR CONTROLLING ROBOTIC DEVICE, AND COMPUTER PROGRAM

CROSS REFERENCE TO RELATED APPLICATIONS

This is a continuation patent application of U.S. application Ser. No. 13/198,066 filed Aug. 4, 2011, which claims priority to Japanese Patent Application No. 2010-177066, filed Aug. 6, 2010 all of which are expressly incorporated by reference herein in their entireties.

BACKGROUND

1. Technical Field

The present invention relates to a robotic device, a method for controlling a robotic device, and a computer program.

2. Related Art

A robotic device having a multijoint structure is often used as a part of an IC handler or an assembling device and has been in heavy usage in a variety of industrial fields. Therefore, the speed and accuracy by which the robotic device can move an arm to a desired position has been a particularly important performance characteristic of such robotic devices.

In general, to move an arm quickly and accurately, it is preferable to reduce the inertial force acting on the arm and to prevent a load for a driving actuator from increasing. To reduce the inertial force acting on the arm, reducing the arm weight has been the most effective measure. However, the reduction of the arm weight results in a reduction in the rigidity of the arm. This causes a problem in that it becomes difficult to suppress vibrations of the arm when the arm stops. Even if a tip portion of the arm is stopped at a target position, a displacement corresponding to the amplitudes of the vibration of the arm itself is caused. Therefore, a subsequent action is not allowed to start until the vibration is sufficiently attenuated.

To cope with this problem, there have been proposed, for example: a method for disposing an acceleration sensor at a tip of an arm to operate the arm based on an acceleration signal, thus suppressing vibrations (e.g., JP A 1-173116); and a method for disposing an angular velocity sensor at a tip of an arm and the arm itself to thereby control the arm operation based on the angular velocity signal (e.g., JP A 2005-242794).

However, since the control signal for suppressing the vibrations is generated using either the angular velocity sensor or the acceleration sensor in the above methods for controlling the robotic device, if an error such as bias drift is included in the sensor signal, an error is caused in the control signal. Thus, accurate control might fail to be achieved in some cases.

In the above JP A 2005-242794, for example, since two types of filters, namely a low-pass filter for eliminating a high-frequency component of the angle sensor and a high-pass filter for eliminating a low-frequency component of the angular velocity sensor, are used in order to reduce the influence of an error of each of the sensors, the amount of operations performed in a control device increases. Thus, there is a problem that too much time is consumed for processing, or costs are increased for an arithmetic device to increase processing speed.

SUMMARY

An advantage of some aspects of the invention is to solve at least a part of the problems described above. The invention can be implemented in the following forms or application examples.

Application Example 1

This application example of the invention is directed to a robotic device including an arm linkage device including a first actuator, a first torque transmission mechanism with which torque of the first actuator is transmitted at a first predetermined reduction ratio, and a first angle sensor adapted to detect a first rotational angle of the first actuator, an arm body having first and second arms linked serially and rotatably with the arm linkage device, a base body to which the arm body is rotatably linked with a base body linkage device including a second actuator disposed on one end of the arm body, a second torque transmission mechanism with which torque of the second actuator is transmitted at a second predetermined reduction ratio, and a second angle sensor adapted to detect a second rotational angle of the second actuator, an inertial sensor attached to the first arm, and including at least an angular velocity sensor, a first calculation section adapted to calculate a first angular velocity of the first arm operating due to the first actuator provided with the first angle sensor based on rotational angle detection data of the first angle sensor, a second calculation section adapted to calculate a second angular velocity of the first arm operating due to the first actuator taking the arm linkage device as an axis based on angular velocity detection data of the inertial sensor provided to the first arm linked via the arm linkage device including the first actuator, which is a calculation object of the first calculation section, and a third calculation section adapted to calculate a torsional angular velocity between the first actuator and the first arm, which is obtained by eliminating a low-frequency component included in a difference between the first angular velocity of the first arm acting due to the first actuator and the second angular velocity of the first arm calculated based on the angular velocity detection data of the inertial sensor.

According to this application example of the invention, the torsional angular velocity is used as the data to be the base of the vibration suppression control of the robotic device to thereby enable the accurate control.

Application Example 2

This application example of the invention is directed to the robotic device of the above application example of the invention, wherein the low-frequency component corresponds to a range lower than a lowest frequency of an antiresonant frequency and a resonant frequency out of mechanical natural frequencies of the robotic device.

According to this application example of the invention, since the low-frequency component is cut without cutting the antiresonant frequency and the resonant frequency, even in the case of using the inertial sensor including an error, it is possible to obtain the torsional angular velocity approximate to the true value which can be obtained by the inertial sensor not including the error in the range with a large gain. Thus it is possible to obtain the robotic device of accurately controlling the vibration using the torsional angular velocity.

Application Example 3

This application example of the invention is directed to the robotic device of the above application example of the invention, which is further provided with a fourth calculation section adapted to calculate a control signal for the first actuator by adding the first angular velocity of the first arm calculated by the first calculation section and the torsional angular velocity calculated by the third calculation section to each other.

According to this application example of the invention, the actual operation is not included in the low-frequency component of the torsional angular velocity. Therefore, the elimination of the low-frequency component of the torsional angular velocity directly corresponds to the elimination of the error (noise) of the inertial sensor. And by using the torsional angular velocity with the low-frequency component eliminated or the arm angular velocity obtained by adding the first angular velocity of the first actuator to the torsional angular velocity with the low-frequency component eliminated as the control data, the accurate vibration suppression control of the robotic device is enabled.

Application Example 4

This application example of the invention is directed to a method for controlling a robotic device including an arm linkage device including a first actuator, a first torque transmission mechanism with which torque of the first actuator is transmitted at a first predetermined reduction ratio, and a first angle sensor adapted to detect a first rotational angle of the first actuator, an arm body having first and second arms linked serially and rotatably with the arm linkage device, a base body to which the arm body is rotatably linked with a base body linkage device including a second actuator disposed on one end of the arm body, a second torque transmission mechanism with which torque of the second actuator is transmitted at a second predetermined reduction ratio, and a second angle sensor adapted to detect a second rotational angle of the second actuator, and an inertial sensor attached to the first arm, and including at least an angular velocity sensor. The method includes a first calculating step of calculating a first angular velocity of the first arm operating due to the first actuator provided with the first angle sensor based on rotational angle detection data of the first angle sensor, a second calculating step of calculating a second angular velocity of the first arm operating due to the first actuator taking the arm linkage device as an axis based on angular velocity detection data of the inertial sensor provided to the first arm linked via the arm linkage device including the first actuator, which is a calculation object in the first calculating step, and a third calculating step of calculating a torsional angular velocity between the first actuator and the first arm, which is obtained by eliminating a low-frequency component included in a difference between the first angular velocity of the first arm acting due to the first actuator and the second angular velocity of the first arm calculated based on the angular velocity detection data of the inertial sensor.

According to this application example of the invention, the torsional angular velocity is used as the data to be the base of the vibration suppression control of the robotic device to thereby make it possible to perform the accurate control.

Application Example 5

This application example of the invention is directed to the method for controlling a robotic device of the above application example of the invention, wherein the low-frequency component corresponds to a range lower than a lowest frequency of an antiresonant frequency and a resonant frequency out of mechanical natural frequencies of the robotic device.

According to this application example of the invention, since the low-frequency component is cut without cutting the antiresonant frequency and the resonant frequency, even in the case of using the inertial sensor including an error, it is possible to obtain the torsional angular velocity approximate to the true value which can be obtained by the inertial sensor not including the error in the range with a large gain. Thus it is possible to accurately control the vibration of the robotic device using the torsional angular velocity.

Application Example 6

This application example of the invention is directed to the method for controlling a robotic device of the above application example of the invention, which is further provided with a fourth calculating step of calculating a control signal for the first actuator by adding the first angular velocity of the first arm calculated in the first calculating step and the torsional angular velocity calculated in the third calculating step to each other.

According to this application example of the invention, the actual operation is not included in the low-frequency component of the torsional angular velocity. Therefore, the elimination of the low-frequency component of the torsional angular velocity directly corresponds to the elimination of the error (noise) of the inertial sensor. And by using the torsional angular velocity with the low-frequency component eliminated or the arm angular velocity obtained by adding the first angular velocity of the first actuator to the torsional angular velocity with the low-frequency component eliminated as the control data, it becomes possible to accurately control and suppress the vibration of the robotic device.

Application Example 7

This application example of the invention is directed to a computer memory storing a computer program executable by a processor, for controlling a robotic device, the robotic device including an arm linkage device including a first actuator, a first torque transmission mechanism with which torque of the first actuator is transmitted at a first predetermined reduction ratio, and a first angle sensor adapted to detect a first rotational angle of the first actuator, an arm body having first and second arms linked serially and rotatably with the arm linkage device, a base body to which the arm body is rotatably linked with a base body linkage device including a second actuator disposed on one end of the arm body, a second torque transmission mechanism with which torque of the second actuator is transmitted at a second predetermined reduction ratio, and a second angle sensor adapted to detect a second rotational angle of the second actuator, and an inertial sensor attached to the first arm, and including at least an angular velocity sensor. The computer program allows the processor to perform the processing including a first calculating procedure calculating a first angular velocity of the first arm operating due to the first actuator provided with the first angle sensor based on rotational angle detection data of the first angle sensor, a second calculating procedure calculating a second angular velocity of the first arm operating due to the first actuator taking the arm linkage device as an axis based on angular velocity detection data of the inertial sensor provided to the first arm linked via the arm linkage device including the first actuator, which is a calculation object in the first calculating procedure, and a third calculating procedure calculating a torsional angular velocity between the first actuator and the first arm, which is obtained by eliminating a low-frequency component included in a difference between the first angular velocity of the first arm acting due to the first actuator and the second angular velocity of the first arm calculated based on the angular velocity detection data of the inertial sensor.

Only by installing the computer program of this application example of the invention on the processor provided to the robotic device, the vibration suppression control of the robotic device described above can easily be performed.

BRIEF DESCRIPTION OF THE DRAWINGS

The invention will be described with reference to the accompanying drawings, wherein like numbers reference like elements.

FIGS. 1A and 1B show a schematic configuration of a robotic device according to an embodiment of the invention, wherein

FIGS. 4A and 4B are graphs showing frequency characteristics of a torsional angular velocity in operation according to an embodiment before and after eliminating a low-frequency component, wherein

DESCRIPTION OF AN EXEMPLARY EMBODIMENT

An embodiment according to the invention will hereinafter be explained with reference to the accompanying drawings.

Embodiment

Figure 1A:
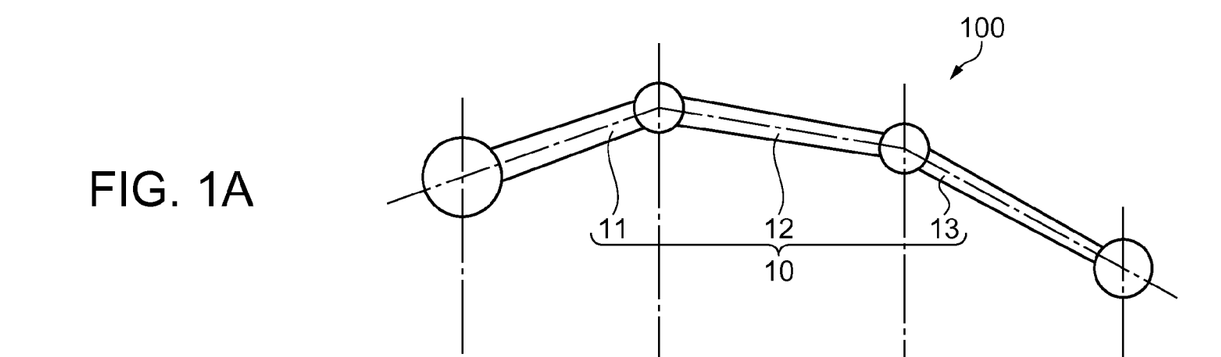
FIG. 1A is a schematic plan view.
Figure 1B:
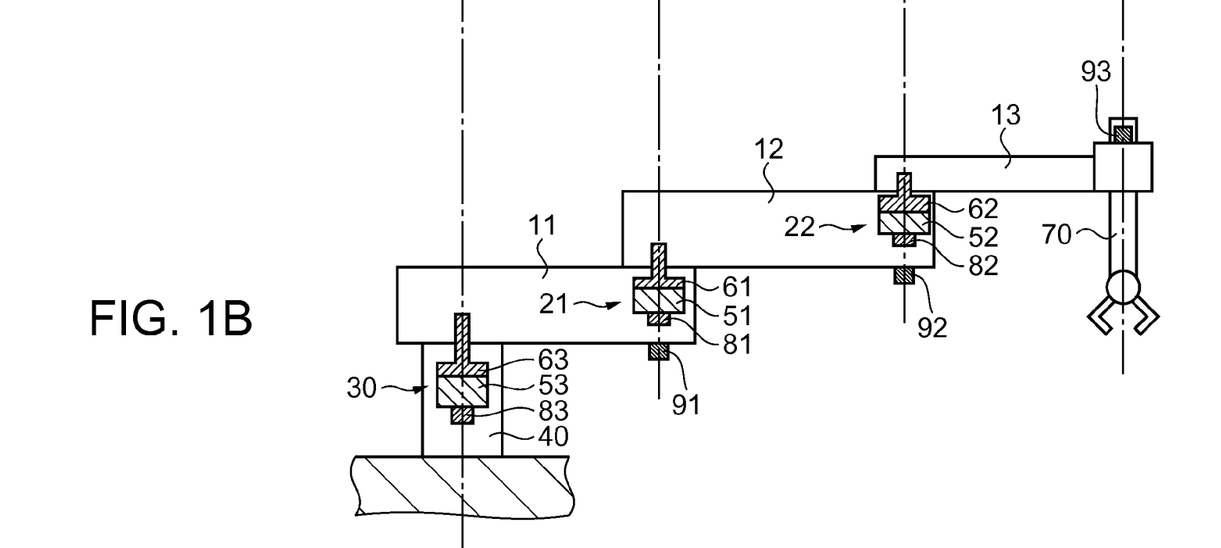
FIG. 1B is a schematic cross-sectional view.

The embodiment according to the invention will be explained. FIGS. 1A and 1B are diagrams showing a robotic device according to the embodiment of the invention, wherein FIG. 1A shows a schematic plan view, and FIG. 1B shows a schematic cross-sectional view. The robotic device according to the present embodiment is a so-called three-axis horizontal articulated robot 100 (hereinafter referred to as a robotic device 100) having three arms linked rotatably in a horizontal direction.

The robotic device 100 is provided with an arm body 10 configured by rotatably and serially linking a first arm 11 and a second arm 12 with a first arm linkage device 21, and the second arm 12 and a third arm 13 with a second arm linkage device 22. The arm body 10 is further linked rotatably to a base body 40, which is fixed to a substrate, with a base body linkage device 30, and thus the robotic device 100 is configured.

The first arm linkage device 21 includes an actuator 51 and a torque transmission device 61 for transmitting the torque of the actuator 51 at a predetermined reduction ratio. The second arm linkage device 22 also includes an actuator 52 and a torque transmission device 62 similarly thereto. Further, the base body linkage device 30 includes an actuator 53 and a torque transmission device 63 for transmitting the torque of the actuator 53 at a predetermined reduction ratio. The tip portion of the third arm 13, which is the tip portion of the arm body 10 on the opposite side to the base body 40, is provided with a work holding device 70 for holding a working tool or an object to be worked.

The actuator 51 included in the first arm linkage device 21 is provided with an angle sensor 81 for detecting a rotational angle. Similarly, the actuator 52 of the second arm linkage device 22 is provided with an angle sensor 82. Further, the base body linkage device 30 is also provided with an angle sensor 83 in the actuator 53. Further, the first arm 11, the second arm 12, and the third arm 13 are respectively provided with inertial sensors 91, 92, and 93. Each of the inertial sensors 91, 92, and 93 includes at least an angular velocity sensor. The inertial sensors 91, 92, and 93 are arranged to be able to detect angular velocities of the first, second, and third arms 11, 12, and 13 at positions to which the inertial sensors 91, 92, and 93 are attached, respectively.

Figure 2:
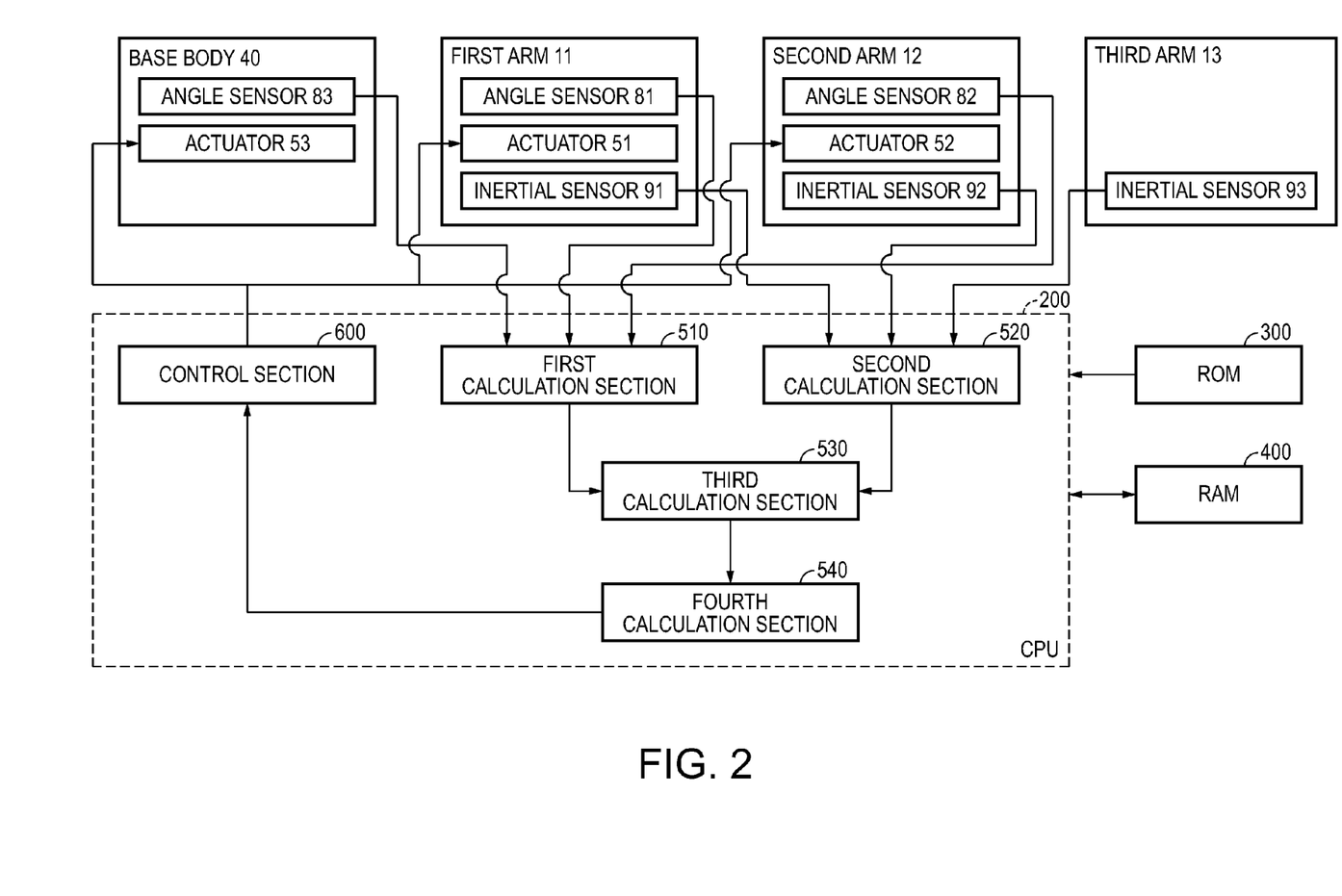
FIG. 2 is a control block diagram of a robotic device according to an embodiment.

FIG. 2 is a block diagram showing a configuration of the robotic device 100 according to the present embodiment. A CPU 200 includes a first calculation section 510, a second calculation section 520, a third calculation section 530, a fourth calculation section 540, and a control section 600, and retrieves and then executes a computer program stored in a ROM 300. Further, a RAM 400 stores data obtained by the execution of the computer program in the CPU 200, and transmits the necessary data to the CPU 200 out of the data thus stored.

Rotational angle data of the actuators 51, 52, and 53 detected by the angle sensors 81, 82, and 83 provided to the robotic device 100 is converted by the first calculation section 510 into a rotational angle $\theta1$ of the actuator 51, a rotational angle $\theta2$ of the actuator 52, and a rotational angle $\theta3$ of the actuator 53. Then a first-order temporal differentiation is performed on each of the rotational angles $\theta1$, $\theta2$, and $\theta3$ thus obtained by the conversion to thereby calculate rotational angular velocities of the respective actuators 51-53.

The rotational angular velocities of the arms driven by the actuators are obtained based on the rotational angular velocities of the actuators thus obtained, respectively. In the case of the first arm 11, since it is driven by the actuator 53 via the torque transmission device 63 with a reduction ratio of $1/N3$, the rotational angular velocity $\omega3$ of an output section of the base body linkage device 30 is obtained as follows.

$$\omega3 = (d\theta3/dt) \times (1/N3)$$

Similarly, the rotational angular velocity $\omega1$ of an output section of the first arm linkage device 21 including the actuator 51 for driving the second arm 12 is obtained as follows.

$$\omega1 = (d\theta1/dt) \times (1/N1)$$

N1: a reduction ratio of the torque transmission device 61

Further, the rotational angular velocity $\omega2$ of an output section of the second arm linkage device 22 including the actuator 52 for driving the third arm 13 is obtained as follows.

$$\omega2 = (d\theta2/dt) \times (1/N2)$$

N2: a reduction ratio of the torque transmission device 62

The second calculation section 520 calculates an angular velocity of the first arm 11, an angular velocity of the second arm 12, and an angular velocity of the third arm 13 based on the data detected by the inertial sensors 91, 92, and 93 provided to the first arm 11, the second arm 12, and the third arm 13, respectively. The angular velocity obtained based on the detection data is the angular velocity taking the base body linkage device 30 as the axis of rotation. Therefore, the angular velocity of the arm taking the corresponding linkage device, namely the first arm linkage device 21 in the case of the second arm 12, or the second arm linkage device 22 in the case of the third arm 13, as the axis of rotation is further calculated based on the angular velocity thus obtained.

Specifically, in the case of the second arm 12, the angular velocity $\omega_{j2}$ taking the first arm linkage device 21 of the second arm 12 as the axis of rotation can be obtained as follows based on the angular velocity $\omega_{a1}$ obtained by the conversion of the detection data obtained from the inertial sensor 91 provided to the first arm 11 and the angular velocity $\omega_{a2}$ obtained by the conversion of the detection data of the inertial sensor 92 provided to the second arm 12.

$$\omega_{j2}=\omega_{a2}-\omega_{a1}$$

Similarly, in the case of the third arm 13, the angular velocity $\omega_{j3}$ taking the second arm linkage device 22 of the third arm 13 as the axis of rotation can be obtained as follows based on the angular velocity $\omega_{a2}$ obtained by the conversion of the detection data obtained from the inertial sensor 92 provided to the second arm 12 and the angular velocity $\omega_{a3}$ obtained by the conversion of the detection data of the inertial sensor 93 provided to the third arm 13.

$$\omega_{j3}=\omega_{a3}-\omega_{a2}$$

In the case of the first arm 11, since the first arm 11 rotates around the base body linkage device 30 provided to the base body 40, the angular velocity $\omega_{a1}$ obtained from the inertial sensor 91 corresponds to the angular velocity of the first arm 11.

The third calculation section 530 calculates the torsional angular velocities as respective differences between the angular velocities $\omega 1$, $\omega 2$, and $\omega 3$ of the second arm 12, the third arm 13, and the first arm 11 taking the linkage device including the actuators as the axis of rotation due to the rotation of the actuators thus calculated as described above, and the angular velocities $\omega_{j2}$, $\omega_{j3}$, and $\omega_{a1}$ of the second arm 12, the third arm 13, and the first arm 11 taking the respective linkage devices as the axes of rotation obtained by the inertial sensors attached to the respective arms.

Specifically, the torsional angular velocity $\omega_{t1}$ between the base body linkage device 30 and the first arm 11 can be obtained as follows.

$$\omega_{t1}=\omega_{a1}-\omega 1$$

Similarly, the torsional angular velocity $\omega_{t2}$ between the first arm linkage device 21 and the second arm 12 can be obtained as follows.

$$\omega_{t2}=\omega_{j2}-\omega 2$$

Further, the torsional angular velocity $\omega_{t3}$ between the second arm linkage device 22 and the third arm 13 can be obtained as follows.

$$\omega_{t3}=\omega_{j3}-\omega 3$$

Figure 3:
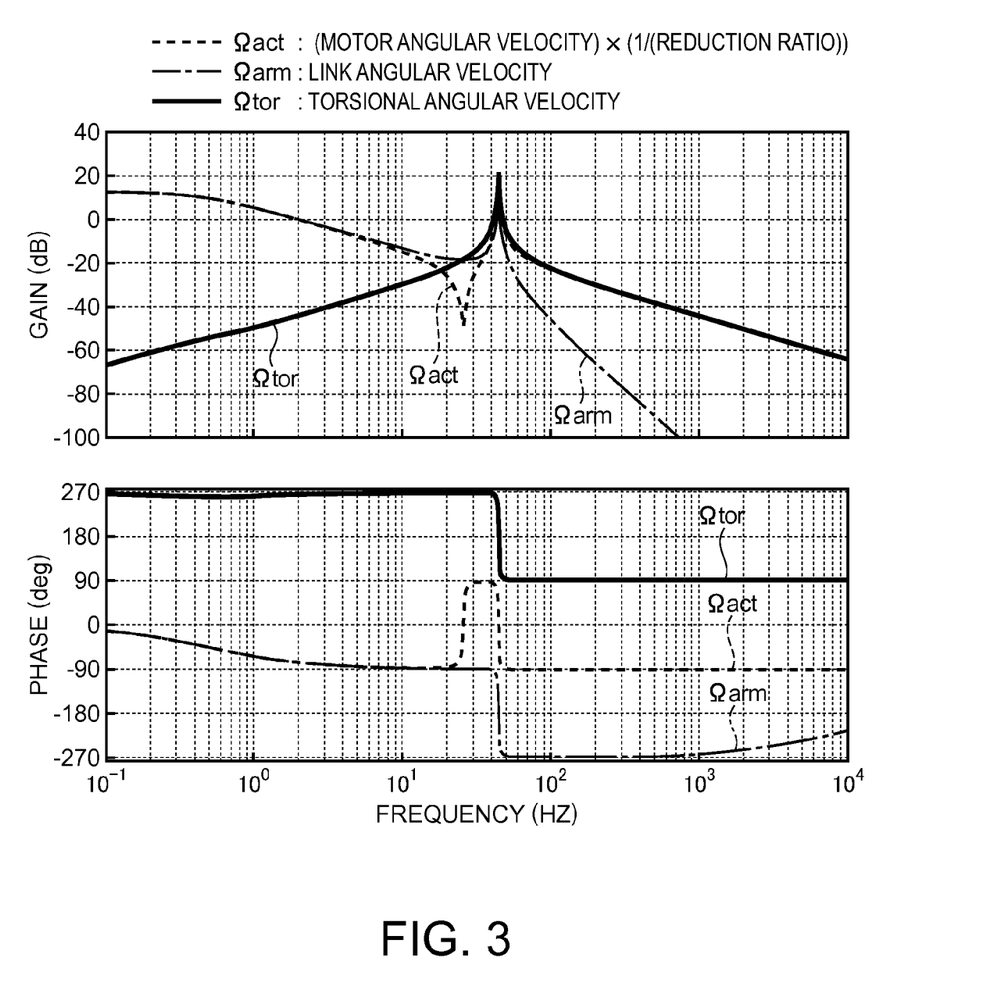
FIG. 3 is a Bode diagram of angular velocity response of an actuator, an arm, and torsion, with respect to torque of the actuator of a robotic device according to an embodiment.

FIG. 3 is a Bode diagram for explaining the response of the angular velocity $\Omega_{act}$ with which the arms are driven by the actuators via the torque transmission device, the angular velocity $\Omega_{arm}$ of the arms obtained by the inertial sensors, and the torsional angular velocity $\Omega_{tor}$ with respect to the torque of the actuators in the robotic device 100. As shown in FIG. 3, although a primary operating component is included in a low-frequency component in the angular velocities $\Omega_{act}$, $\Omega_{arm}$, an actual operating component is hardly included in the low-frequency component in the torsional angular velocity $\Omega_{tor}$. Taking the point described above into consideration, according to the invention, the low-frequency component of the torsional angular velocity $\Omega_{tor}$ is regarded as a component corresponding to influence of an error due to, for example, the bias drift of the sensor, and is eliminated therefrom to thereby make it possible to eliminate the low-frequency noise of the robotic device 100 to thereby accurately control the vibration of the robotic device 100.

Figure 4A:
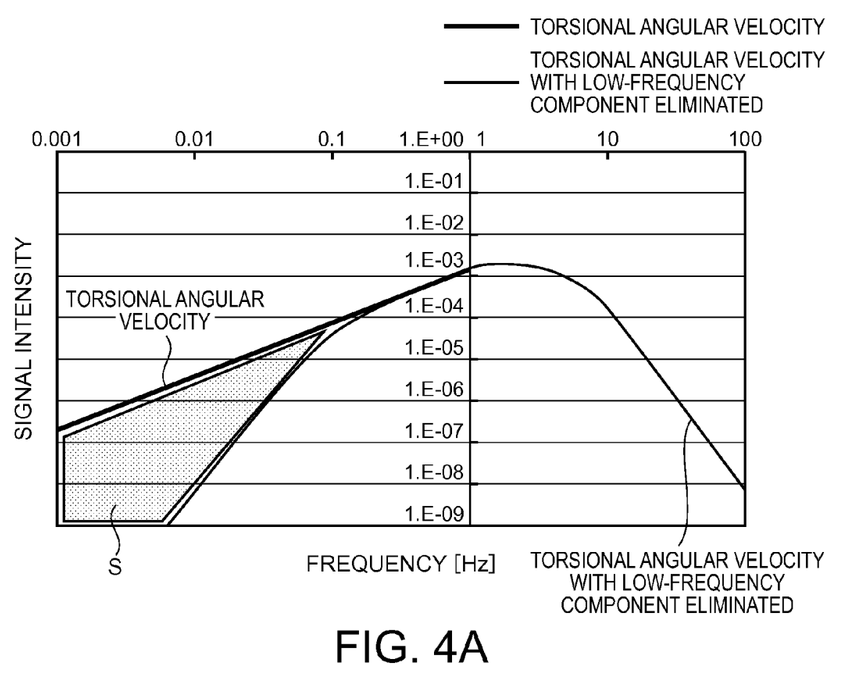
FIG. 4A shows the case of an inertial sensor without an error.
Figure 4B:
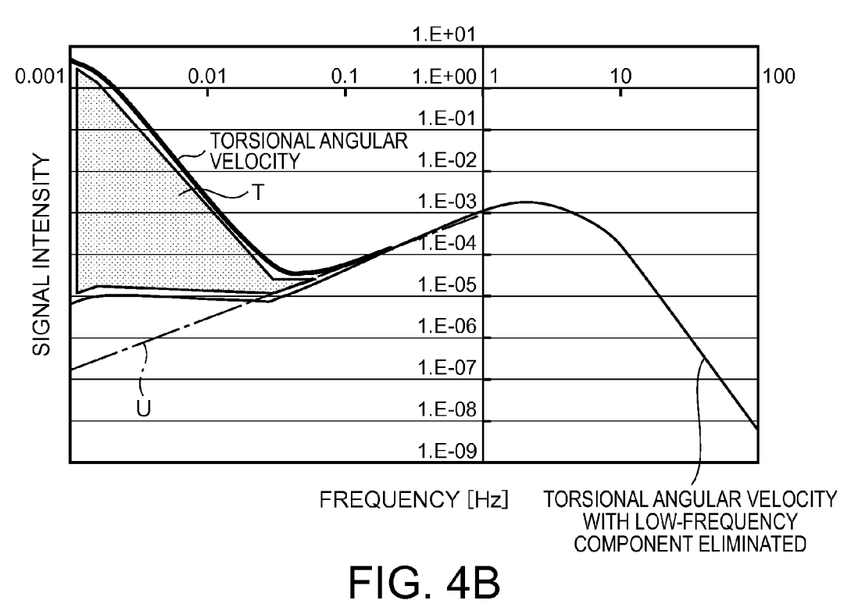
FIG. 4B shows the case of an inertial sensor with a low-frequency error.

FIGS. 4A and 4B are diagrams conceptually showing frequency characteristics of a torsional angular velocity in operation, and show the condition of eliminating a low-frequency component with measures such as a high-pass filter. FIG. 4A shows the case of an inertial sensor without an error, and FIG. 4B shows the case of the inertial sensor with a low-frequency error such as the bias drift. Further, the difference between FIG. 4A and FIG. 4B corresponds to the component of the error of the inertial sensor.

By eliminating the low-frequency component from the torsional angular velocity $\Omega_{tor}$ before eliminating the low-frequency component show in FIG. 4A with the high-pass filter, the torsional angular velocity $\Omega_{tor'}$ can be obtained. In FIG. 4B, by similarly eliminating the low-frequency component from the torsional angular velocity $\Omega'_{tor}$ before eliminating the low-frequency component, the torsional angular velocity $\Omega'_{tor'}$ can be obtained. As shown in FIG. 4A, the torsional angular velocity $\Omega_{tor'}$ obtained by eliminating the low-frequency component has the gain smaller than that of the torsional angular velocity $\Omega_{tor}$ before the elimination in the frequency range of the component thus eliminated. However, in the range S the gain takes a minute value of, for example, $10^{-5}$ or smaller, and therefore, the eliminated component is in a negligible level.

In contrast, in the case of the inertial sensor having an error shown in FIG. 4B, the difference area T generated between before and after the elimination of the low-frequency component by the high-pass filter is located in the range with large gain. Therefore, by eliminating the low-frequency component, it is possible to approximate the gain to the value U without the error and before eliminating the low-frequency component in FIG. 4B. Therefore, by eliminating the low-frequency component of the torsional angular velocity, it is possible to obtain the torsional angular velocity without the error. In other words, the torsional angular velocity near to the true value is obtained even with the inertial sensor having the low-frequency error such as the bias drift, and thus it becomes possible to accurately control the vibration of the robotic device 100 due to the torsional angular velocity.

Specifically, with respect to the torsional angular velocities $\omega_{t1}$, $\omega_{t2}$, and $\omega_{t3}$ thus obtained in the manner as described above, the torsional angular velocities $\Omega_{t1}$, $\Omega_{t2}$, and $\Omega_{t3}$ obtained by eliminating the low-frequency component out of the frequency components thereof with the high-pass filter not shown (hereinafter referred to as an HPF) are calculated. Here, it is preferable to use the HPF having a filtering frequency lower than the lowest frequency of the antiresonant frequency and the resonant frequency out of the mechanical natural frequencies of the robotic device 100.

It is possible to generate a control signal in the control section 600 using the torsional angular velocities $\Omega_{t1}$, $\Omega_{t2}$, and $\Omega_{t3}$ with the low-frequency component eliminated to thereby control the respective actuators 51, 52, and 53. In this case, it is also possible to provide the fourth calculation section 540 to thereby add the angular velocities ω2, ω3, and ω1 to be transmitted to the second arm 12, the third arm 13, and the first arm 11 via the torque transmission devices 61, 62, and 63 of the respective linkage devices 21, 22, and 30 to the torsional angular velocities $\Omega_{t1}$, $\Omega_{t2}$, and $\Omega_{t3}$ with the low-frequency component eliminated, and to generate the control signal in the control section 600 using the results.

Figure 5:
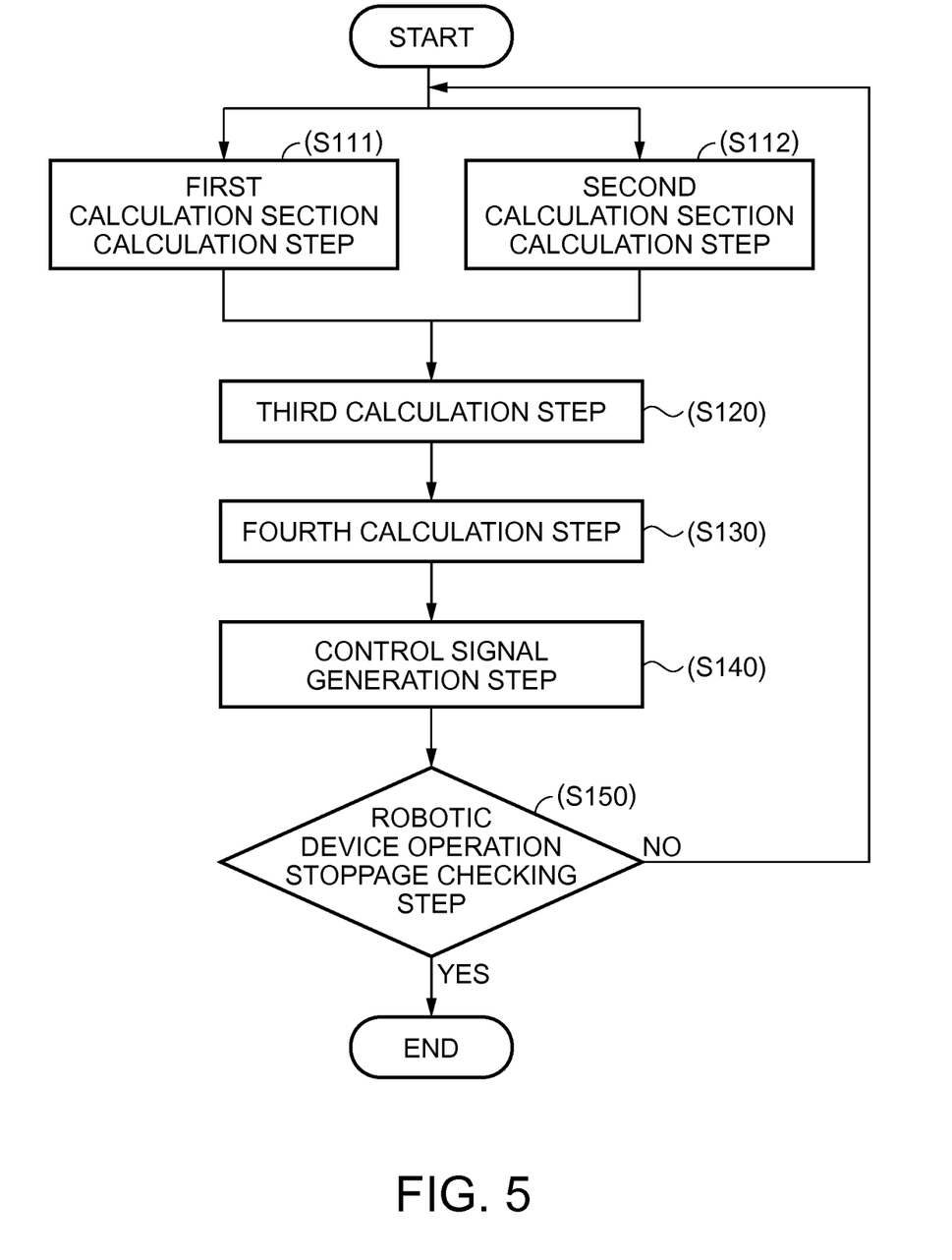
FIG. 5 is a flow diagram of a control method according to an embodiment.

FIG. 5 is a flow diagram showing the method for controlling the robotic device 100 according to the present embodiment. In the operating state of the robotic device 100, the first calculation section 510 obtains the rotational angle data from the angle sensors 81, 82, and 83 provided to the actuators firstly in the first calculation step (S111). The first calculation section 510 performs the conversion from the angle data thus obtained to the rotational angles and the first-order temporal differentiation on the rotational angles to thereby calculate the rotational angular velocity ω1 of the output section of the first arm linkage device 21 including the actuator 51 for driving the second arm 12, the rotational angular velocity ω2 of the output section of the second arm linkage device 22 including the actuator 52 for driving the third arm 13, and the rotational angular velocity ω3 of the output section of the base body linkage device 30.

Further, at the same time, in the second calculation step (S112), the second calculation section obtains the angular velocity data from the inertial sensors 91, 92, and 93 provided to the respective arms, and then calculates the angular velocities taking the respective linkage devices for linking and driving the respective arms as the axes of rotation. Specifically, in the second arm 12, the angular velocity $\omega_{j2}$ taking the first arm linkage device 21 of the second arm 12 as the axis of rotation can be calculated by the following formula based on the angular velocity $\omega_{a1}$ obtained by the conversion of the detection data obtained from the inertial sensor 91 provided to the first arm 11 and the angular velocity $\omega_{a2}$ obtained by the conversion of the detection data of the inertial sensor 92 provided to the second arm 12.

$$\omega_{j2}=\omega_{a2}-\omega_{a1}$$

Similarly, in the third arm 13, the angular velocity $\omega_{j3}$ taking the second arm linkage device 22 of the third arm 13 as the axis of rotation can be calculated by the following formula based on the angular velocity $\omega_{a2}$ obtained by the conversion of the detection data obtained from the inertial sensor 92 provided to the second arm 12 and the angular velocity $\omega_{a3}$ obtained by the conversion of the detection data of the inertial sensor 93 provided to the third arm 13.

$$\omega_{j3}=\omega_{a3}-\omega_{a2}$$

It should be noted that in the first arm 11, since the first arm 11 rotates around the base body linkage device 30 provided to the base body 40, the angular velocity $\omega_{a1}$ obtained from the inertial sensor 91 corresponds to the angular velocity of the first arm 11.

Then, the process proceeds to the third calculation step (S120). In the third calculation step (S120), the following torsional angular velocities are calculated based on the differences between the angular velocities ω1, ω2, and ω3 calculated in the first calculation step (S111) and the angular velocities $\omega_{a1}$, $\omega_{j2}$, and $\omega_{j3}$ calculated in the second calculation step (S112), respectively.

$$\omega_{t1}=\omega_{a1}-\omega 1$$

$$\omega_{t2}=\omega_{j2}-\omega 2$$

$$\omega_{t3}=\omega_{j3}-\omega 3$$

The torsional angular velocities $\omega_{t1}$, $\omega_{t2}$, and $\omega_{t3}$ thus calculated are filtered with the high-pass filter for eliminating the component having a frequency lower than the lowest frequency of the antiresonant frequency and the resonant frequency out of the mechanical natural frequencies of the robotic device 100 to thereby calculate the torsional angular velocities $\Omega_{t1}$, $\Omega_{t2}$, and $\Omega_{t3}$ with the low-frequency component eliminated.

Then, the process proceeds to the fourth calculation step (S130). In the fourth calculation step (S130), the angular velocities ω2, ω3, and ω1 to be transmitted to the second arm 12, the third arm 13, and the first arm 11 via the torque transmission devices 61, 62, and 63 of the respective linkage devices 21, 22, and 30 are added to the torsional angular velocities $\Omega_{t1}$, $\Omega_{t2}$, and $\Omega_{t3}$ with the low-frequency component eliminated by the high-pass filter, which are calculated in the third calculation step (S120). Then the results are transmitted to the control signal generation step (S140).

In the control signal generation step (S140), the control section 600 generates the control signals of the respective actuators based on the calculation results in the fourth calculation step (S130) thus obtained. In other words, the control section 600 generates the control signals for controlling the respective actuators based on the angular velocities obtained by adding the angular velocities ω2, ω3, and ω1 to be transmitted to the second arm 12, the third arm 13, and the first arm 11 via the torque transmission devices 61, 62, and 63 of the respective linkage devices 21, 22, and 30 to the torsional angular velocities $\Omega_{t1}$, $\Omega_{t2}$, and $\Omega_{t3}$ with the low-frequency component eliminated by the high-pass filter.

Then, the process proceeds to the robotic device operation stoppage checking step (S150). In the robotic device operation stoppage checking step (S150), whether or not the robotic device 100 is in the operating state is checked. If it is in the operating state (No), the process proceeds to the first calculation step (S111) and the second calculation step (S112), and the control is repeated. If it is in the rest state (operation stoppage) (Yes), the control is terminated.

As described above, by using the torsional angular velocities as the control data, and further by using the torsional angular velocities with the low-frequency component eliminated as the control data, the accurate vibration suppression control of the robotic device with the error components of the inertial sensors eliminated becomes possible.

Specific Examples

First Specific Example

A specific example of control of a robotic device according to the embodiment based on a torsional angular velocity will be explained. Four state quantities, namely an actuator angle, an arm angle (link angle), an actuator angular velocity, and an arm angular velocity, are used in an equation for calculating a torque command value τ supplied to an actuator. And "(the torsional angular velocities ($\Omega_{t1}$, $\Omega_{t2}$, and $\Omega_{t3}$) with the low-frequency component eliminated)+(the angular velocities (ω2, ω3, and ω1) to be transmitted to the arms via the torque transmission devices of the respective linkage devices)" explained in the embodiment described above is used as the arm angular velocity among these state quantities.

The actuator angle, the arm angle (the link angle), the actuator angular velocity, and the arm angular velocity obtained by adding the angular velocity transmitted to the arm via the torque transmission device of the linkage device to the torsional angular velocity with the low-frequency component eliminated, as the four state quantities described above are measured. Then the state feedback control system is established using the formula 1 below based on the four state quantities thus measured.

$$\tau_i = -k_{5i} \int (\theta_{mri} - \theta_{mi}) dt - [k_{1i} \quad k_{2i} \quad k_{3i} \quad k_{4i}] \begin{bmatrix} \theta_{mi} \\ \theta_{ti} \\ \dot{\theta}_{mi} \\ \dot{\theta}_{ai} \end{bmatrix} \quad (1)$$

$(i = 1, 2, 3)$ $\begin{bmatrix} \tau_i: \text{ actuator torque command} \\ \theta_{mr}: \text{ target value of the torque transmission} \\ \text{device (actuator) angle} \\ \theta_m: \text{ torque transmission device (actuator) angle} \\ \text{calculated from the angular sensor information} \\ \theta_a: \text{ arm angle( = approximate integration of the arm angular} \\ \text{velocity(torsional angular velocity + torque} \\ \text{transmission device angular velocity))} \\ \dot{\theta}_m: \text{ first - order differentiation of} \\ (\text{ = angular velocity at which } \theta_m \text{ the} \\ \text{torque transmission device performs driving)} \\ \dot{\theta}_a: \text{ first - order differentiation of} \\ \dot{\theta}_a(\text{ = angular angular velocity(torsional angular velocity +} \\ \text{torque transmission device angular velocity))} \\ k_1, k_2, k_3, k_4, k_5: \text{ control gains} \end{bmatrix}$ The symbols $k_1$ through $k_5$ in the formula 1 are internal control gains of the control device, and can be determined by the pole placement method, the optimum regulator, and so on. By performing the control using the torque command value τ thus obtained, the vibration of the robotic device is suppressed to thereby enable the accurate operation.

Although in the specific example described above an example of using "(the torsional angular velocities ($\Omega_{t1}$, $\Omega_{t2}$, and $\Omega_{t3}$) with the low-frequency component eliminated)+(the angular velocities (ω2, ω3, and ω1) to be transmitted to the arms via the torque transmission devices of the respective linkage devices)" explained in the embodiment described above as the arm angular velocity is explained, it is possible to establish the control system with small amount of calculation by using the "torsional angular velocity" as the state quantity instead of the arm angular velocity.

Specifically, the torsional angle $\theta_t$ and the torsional angular velocity (the torsional angular velocities $\Omega_{t1}$, $\Omega_{t2}$, and $\Omega_{t3}$ in the embodiment) are used instead of the arm angle $\theta_a$ and the arm angular velocity $d\theta_a/dt$, which is a first-order differentiation of the arm angle $\theta_a$, in the formula 1 to thereby establish the control system using the formula 2 below.

$$\tau_i = -k_{t5i} \int (\theta_{mri} - \theta_{mi}) dt - [k_{t1i} \quad k_{t2i} \quad k_{t3i} \quad k_{t4i}] \begin{bmatrix} \theta_{mi} \\ \theta_{ti} \\ \dot{\theta}_{mi} \\ \dot{\theta}_{ti} \end{bmatrix} \quad (2)$$

$(i = 1, 2, 3)$ $\begin{bmatrix} \tau_i: \text{ actuator torque command} \\ \theta_{mr}: \text{ target value of the torque transmission} \\ \text{device (actuator) angle} \\ \theta_m: \text{ torque transmission device (actuator) angle} \\ \text{calculated from the angular sensor information} \\ \theta_t: \text{ torsional angle( = approximate integration of} \\ \text{the torsional angular velocity)} \\ \dot{\theta}_m: \text{ first - order differentiation of} \\ \theta_m(\text{ = angular velocity at which} \\ \text{the torque transmission device performs driving)} \\ \dot{\theta}_t: \text{ first - order differentiation of} \\ \theta_t(\text{ = torsional angular velocity)} \\ k_{t1}, k_{t2}, k_{t3}, k_{t4}, k_{t5}: \text{ control gains} \end{bmatrix}$ The symbols $k_{t1}$ through $k_{t5}$ in the formula 2 are internal control gains of the control device, and can be determined by the pole placement method, the optimum regulator, and so on. By performing the control using the torque command value τ thus obtained, the vibration of the robotic device is suppressed to thereby enable the accurate operation.

Second Specific Example

Figure 6:
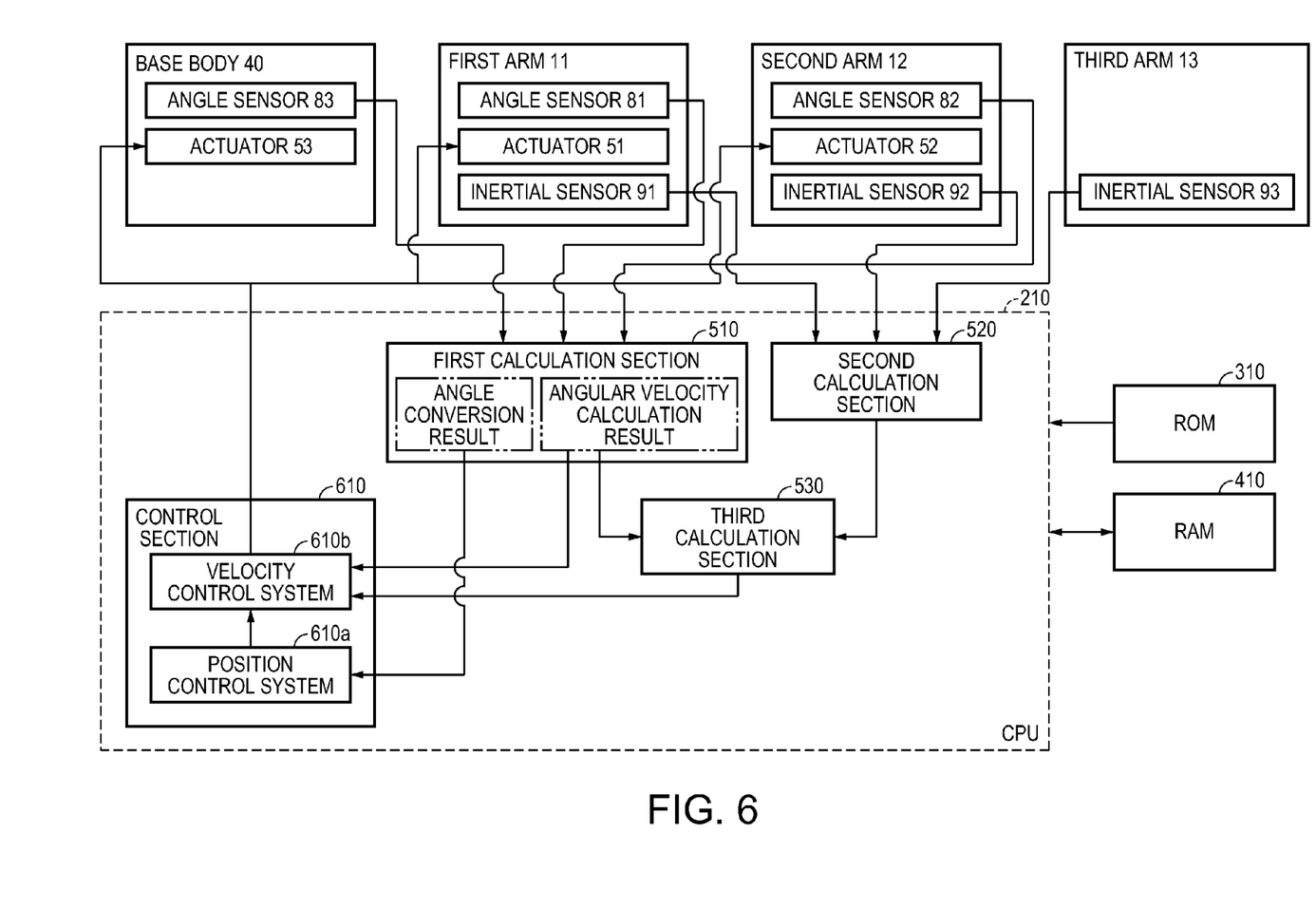
FIG. 6 is a block diagram showing a second specific example.

Another specific example will be explained with reference to a block diagram shown in FIG. 6. The block diagram shown in FIG. 6 is different from the block diagram shown in FIG. 2 in the embodiment described above. A position control system 610a and a velocity control system 610b in the control section 610 obtain the calculation result, and then perform the control. Therefore, the same constituents as in the embodiment are provided with the same reference symbols, and the explanation therefore will be omitted.

Also in the present specific example shown in FIG. 6, the CPU 210 includes the first calculation section 510, the second calculation section 520, the third calculation section 530, and a control section 610, and retrieves and then executes a computer program stored in the ROM 310. Further, the RAM 410 stores the data obtained by the execution of the computer program in the CPU 210, and transmits the necessary data to the CPU 210 out of the data thus stored.

As shown in the block diagram of FIG. 6, in the control of the present specific example, the position control system 610a obtains the rotational angle data of the actuators converted by the first calculation section 510. Further, the velocity control system 610b similarly obtains the angular velocity data of the actuators calculated in the first calculation section. The velocity control system 610b also obtains the torsional angular velocity data calculated by the third calculation section 530, and then the velocity control system 610b outputs a torque command to the robotic device 100 together with an angular velocity command input from the position control system 610a. By performing the control described above, the vibration of the robotic device is suppressed to thereby enable the accurate operation.

The embodiment and the specific examples described above are explained using the horizontal articulated arm body 10 provided with three arms shown in FIGS. 1A and 1B, the invention is not limited thereto, but can also be applied to a robotic device provided with two arms or a robotic device provided with four or more arms. Further, regarding the type of the robotic device, the invention can also be applied to a robotic device provided with movable arms such as a direct acting type or a vertical articulated type.

It will be apparent that the robotic device, the method for controlling a robotic device, and the computer program being thus described may be varied in many ways. Such variations are not to be regarded as a departure from the spirit and scope of the invention, and all such modifications are intended to be included within the scope of the claims.

What is claimed is:

1. A robotic device comprising:
an arm that is rotationally connected to an actuator;
an angle sensor that detects a rotational angle of the actuator;
an inertial sensor that is provided at the arm and that detects a sensed angular velocity of the arm; and
a controller that controls the arm, wherein
the controller performs vibration suppression control based on an output of the inertial sensor and an output of the angular sensor, and the controller performs a velocity control based on the output of the angle sensor.

2. The robotic device according to claim 1, wherein the controller performs a position control based on the output of the angle sensor.

3. A method for controlling a robotic device that includes:
an arm that is rotationally connected to an actuator;
an angle sensor that detects a rotational angle of the actuator;
an inertial sensor that is provided at the arm and that detects a sensed angular velocity of the arm; and
a controller that controls the arm,
the method comprising:
performing vibration suppression control based on an output of the inertial sensor and an output of the angular sensor; and
performing velocity control based on the output of the angle sensor.

4. The method for controlling a robotic device according to claim 3, further comprising:
performing position control based on the output of the angle sensor.

5. A computer program product embodying computer readable instructions stored on a non-transitory computer readable medium for controlling a robotic device that includes:
an arm that is rotationally connected to an actuator;
an angle sensor that detects a rotational angle of the actuator;
an inertial sensor that is provided at the arm and that detects a sensed angular velocity of the arm; and
a controller that controls the arm,
the computer program comprising:
instructions for performing vibration suppression control based on an output of the inertial sensor and an output of the angular sensor; and
instructions for performing velocity control based on the output of the angle sensor.

6. The computer program product embodying computer readable instructions stored on a non-transitory computer readable medium for controlling a robotic device according to claim 5, further comprising:
instructions for performing position control based on the output of the angle sensor.

* * * * *